(12) United States Patent
Mackal (10) Patent No.: US 7,673,647 B2
(45) Date of Patent: *Mar. 9, 2010

(54) INFLATION VALVE WITH PNEUMATIC ASSIST

(75) Inventor: Glenn H. Mackal, South Pasadena, FL (US)

(73) Assignee: Halkey-Roberts Corporation, St. Petersburg, FL (US)

( * ) Notice: Subject to any disclaimer, the term of this patent is extended or adjusted under 35 U.S.C. 154(b) by 406 days.

This patent is subject to a terminal disclaimer.

(21) Appl. No.: 11/677,030

(22) Filed: Feb. 20, 2007

(65) Prior Publication Data

US 2007/0193625 A1    Aug. 23, 2007

Related U.S. Application Data

(63) Continuation-in-part of application No. 10/935,944, filed on Sep. 8, 2004, now Pat. No. 7,178,547.

(60) Provisional application No. 60/501,297, filed on Sep. 8, 2003.

(51) Int. Cl.
  *B67B 7/64* (2006.01)
  *F16K 17/14* (2006.01)
(52) U.S. Cl. .............................. 137/68.3; 222/5; 441/93
(58) Field of Classification Search ................ 137/68.3, 137/68.13; 169/11; 441/41, 93; 222/5
See application file for complete search history.

(56) References Cited

U.S. PATENT DOCUMENTS

| 1,230,290 | A |   | 6/1917 | Geiger |  |
| 1,945,715 | A |   | 2/1934 | Wiswell |  |
| 2,059,189 | A |   | 11/1936 | Allen |  |
| 4,805,802 | A |   | 2/1989 | MacKendrick et al. |  |
| 4,959,034 | A | * | 9/1990 | Wass | 441/41 |
| 6,089,403 | A |   | 7/2000 | Mackal |  |
| 7,178,547 | B2 | * | 2/2007 | Mackal | 137/68.3 |

OTHER PUBLICATIONS

International Search Rpt., Mar. 24, 2005, Mackal.

* cited by examiner

*Primary Examiner*—John Rivell
*Assistant Examiner*—Christopher Pilling
(74) *Attorney, Agent, or Firm*—GrayRobinson, P.A.

(57) ABSTRACT

A pneumatically assisted inflator for gas cylinders comprises an inline configuration such that gas contained within the gas cylinder flows axially through the inflator to be exhausted therefrom and inflate an inflatable article. The inline configuration of the inflator reduces the stress otherwise imparted to the component parts thereof and thereby allows most of the component parts to be manufactured from an injection molded high-strength plastic or the like. The inflator comprises an inflator piston positioned within a piston cylinder that moves against a rotatable cam surface, such as a rotatable collar connected to a pull lanyard, to force a pierce pin to make at least a small pin hole in a frangible seal and allow high pressure gas from the gas cylinder to flow into the piston cylinder, whereupon the high pressure gas in the piston cylinder further moves the inflator piston to more fully force the pierce pin into the frangible seal to fully open the frangible seal.

10 Claims, 8 Drawing Sheets

INFLATION VALVE WITH PNEUMATIC ASSIST

CROSS-REFERENCE TO RELATED APPLICATIONS

This application is a continuation-in-part application of Ser. No. 10/935,944 filed Sep. 8, 2004, now U.S. Pat. No. 7,178,547 issued Feb. 20, 2007, which claims priority of provisional application No. 60/501,297, filed Sep. 8, 2003, the disclosures of which are each hereby incorporated by reference herein.

BACKGROUND OF THE INVENTION

1. Field of the Invention

This invention relates to inflation valves for compressed gas cylinders used for inflating inflatable articles such as life rafts. More particularly, this invention relates to inflation valves that utilize the pressure of the gas in the gas cylinder to assist in the opening of the valve to a fully-open position by pulling on an inflation handle.

2. Description of the Background Art

Presently, there exists many types of inflation valves designed to be used in conjunction with compressed gas cylinders or the like. In their simplest forms, inflation valves may comprise a knob or handle which is turned to open a flow passageway allowing the compressed gas within the cylinder to inflate the inflatable article. However, even more prevalent are inflation valves for sealed gas cartridges that are operable by means of a jerk handle and lanyard cord that allow the inflatable article to be quickly inflated by a simple jerking of the handle which forces a pierce pin to fracture the frangible seal of the gas cartridge allowing the compressed gas therein to flow to and inflate the inflatable article.

Due to the large force necessary to fracture the frangible seal of a conventional gas cylinder, more contemporary designs of inflation valves employ a powerful spring which is held in its cocked position by means of a sear. Upon jerking of the jerk handle by the user, the sear is released allowing the powerful spring to very forcibly force the pierce pin through the frangible seal of the gas cartridge.

To eliminate the need for inflators having powerful firing springs held in cocked positions, still more contemporary inflation valves utilize the internal pressure of the gas cylinder to assist in driving the pierce pin fully through an internal frangible seal. A representative inflation system with such a pneumatic assist feature, is disclosed in my U.S. Pat. No. 6,089,403, the disclosure of which is hereby incorporated by reference herein. However, there presently exists a need for pneumatically assisted inflators that are configured in such a manner that virtually all of the components thereof may be manufactured from a high-strength, injectable plastic thereby obviating the need for extensive machining of metal parts and the attendant manufacturing and assembly costs thereof.

Therefore, it is an object of this invention to provide an improvement which overcomes the aforementioned inadequacies of the prior art devices and provides an improvement which is a significant contribution to the advancement of the inflation art.

Another object of this invention is to provide an inflator with pneumatic assist that is configured in such a manner that its component parts may be manufactured from an injectable high-strength plastic material.

Another object of this invention is to provide an inflator with pneumatic assist having an inflator body removable from a valve body such that the valve body may be mounted on the gas cylinder and the gas cylinder filled with compressed gas and then at some later point in time, the inflator body installed thereon.

Another object of this invention is to provide a pneumatically assisted inflator having an inline configuration such that the O-ring seal of the pneumatic piston does not wipe across the exhaust port as taught by my prior patent, U.S. Pat. No. 6,089,403.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a pneumatically assisted inflator for gas cylinders. The inflator of the invention uniquely comprises an inline configuration such that gas contained within the gas cylinder flows axially through the inflator to be exhausted therefrom and inflate the inflatable article. The inline configuration of the inflator of this invention reduces the stress otherwise imparted to the component parts thereof, and thereby allows most of the component parts to be manufactured from an injection molded high-strength plastic or the like.

Moreover, the inline configuration of the present invention eliminates the need for the O-ring seal of the inflator piston to wipe across the exhaust opening possibly bursting the O-ring through the exhaust opening. Further, possible damage to the O-ring by the edge of the exhaust hole as it is explosively wiped thereacross is eliminated.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
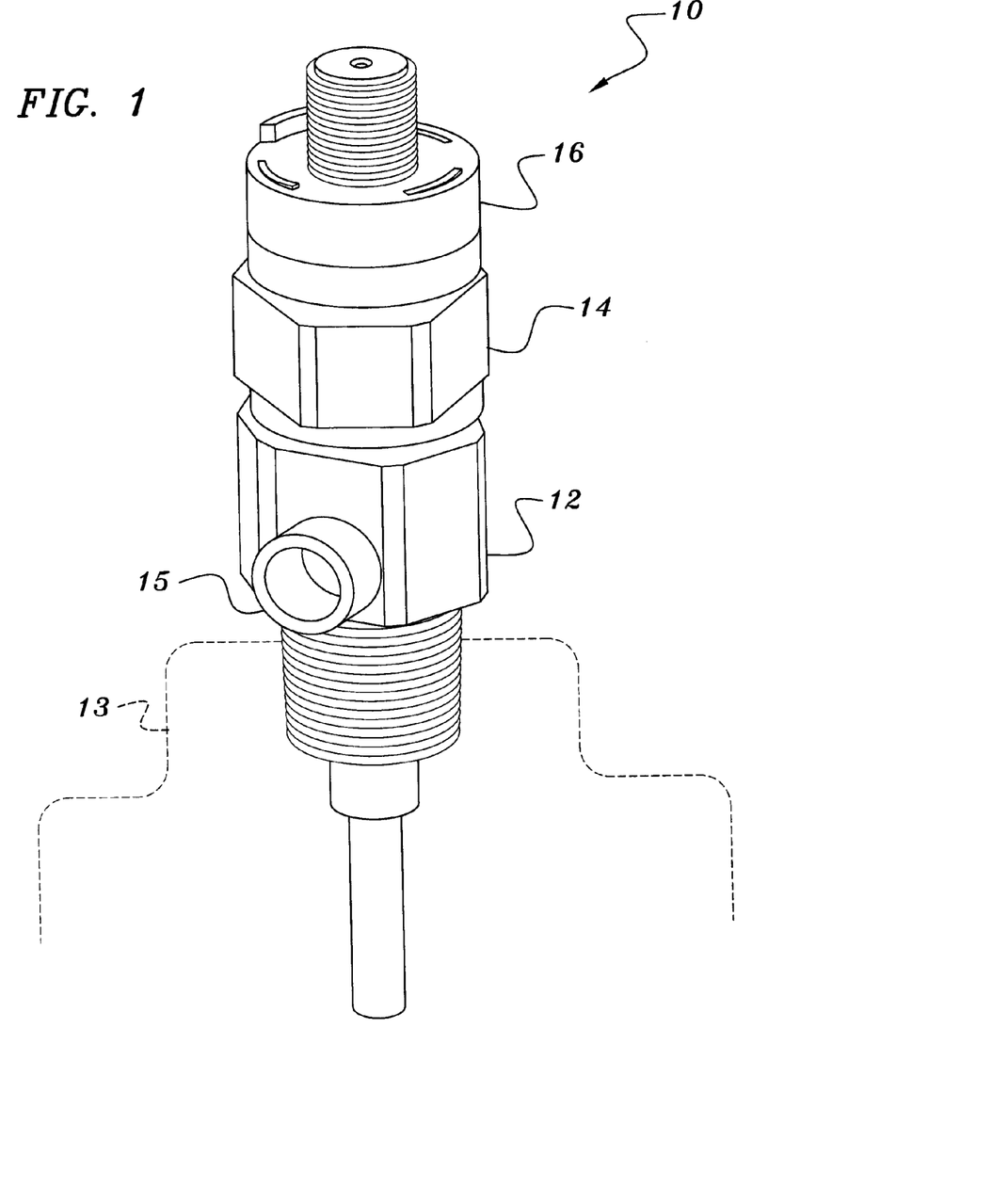
FIG. 1 is a perspective view of the inflator of the invention.
Figure 2:
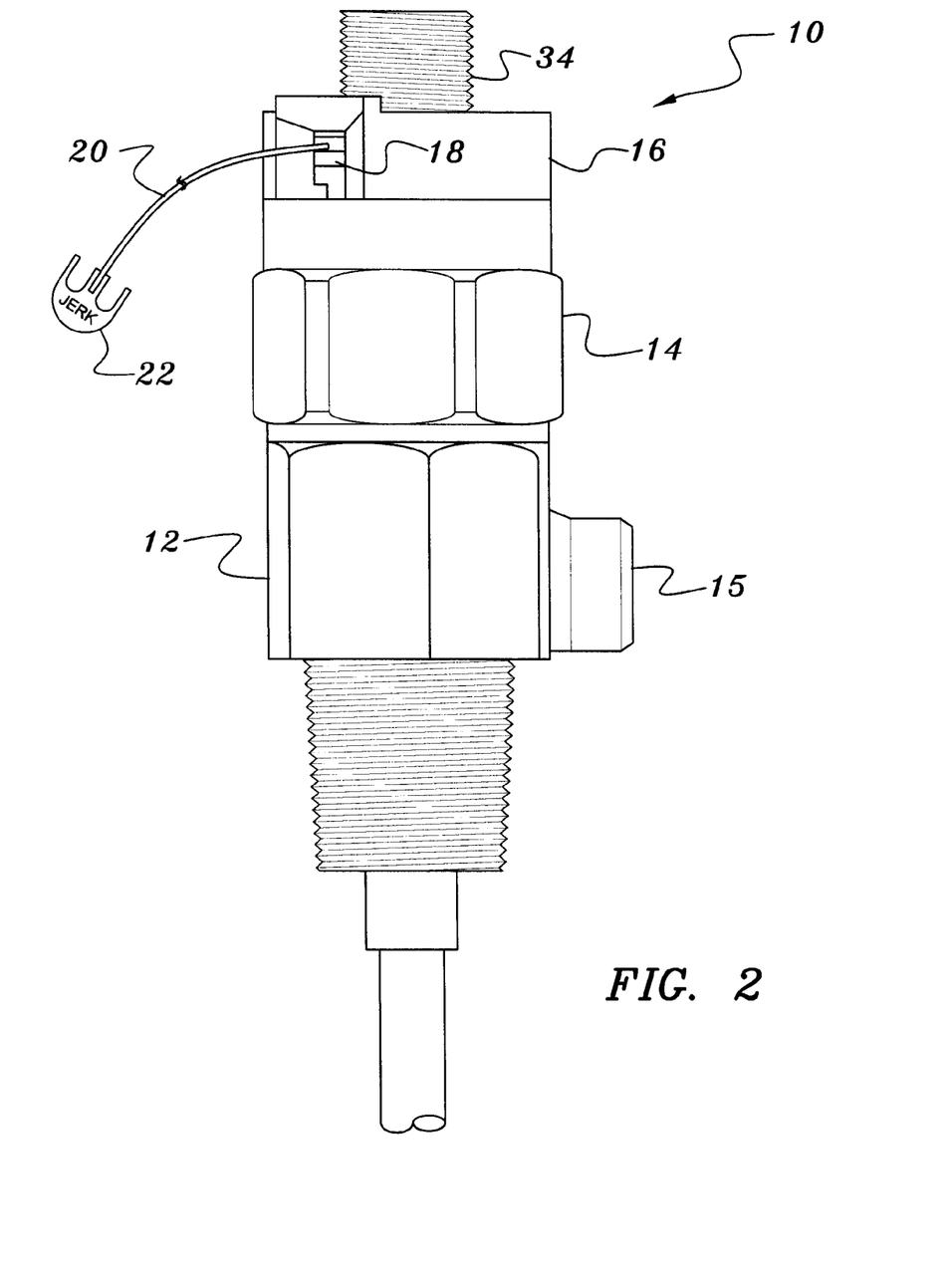
FIG. 2 is a side elevational view of the inflator of the invention.

Referring to FIGS. 1 and 2, the inflator 10 of the invention comprises a valve portion 12 to which is threadably coupled an inflator portion 14. As will become evident hereinafter, the valve portion 12 may be threadably coupled to the threaded neck of a gas cylinder 13 (shown in phantom) to then be filled via inlet 15 without necessarily requiring the installation of the inflator portion 14. Then, after the gas cylinder 13 has been filled with the appropriate gas, the inflator portion 14 may be installed by simple threaded engagement with the valve portion 12.

The inflator portion 14 comprises a rotatable inflator collar 16 having a side opening 18 through which is threaded a lanyard cord 20 of a conventional jerk-to-inflate handle 22. The end of the lanyard cord 20 is connected to a rotatable cam 16C positioned inside the collar 16. The underside of the rotatable cam 16C including a cam surface 16S.

Figure 3:
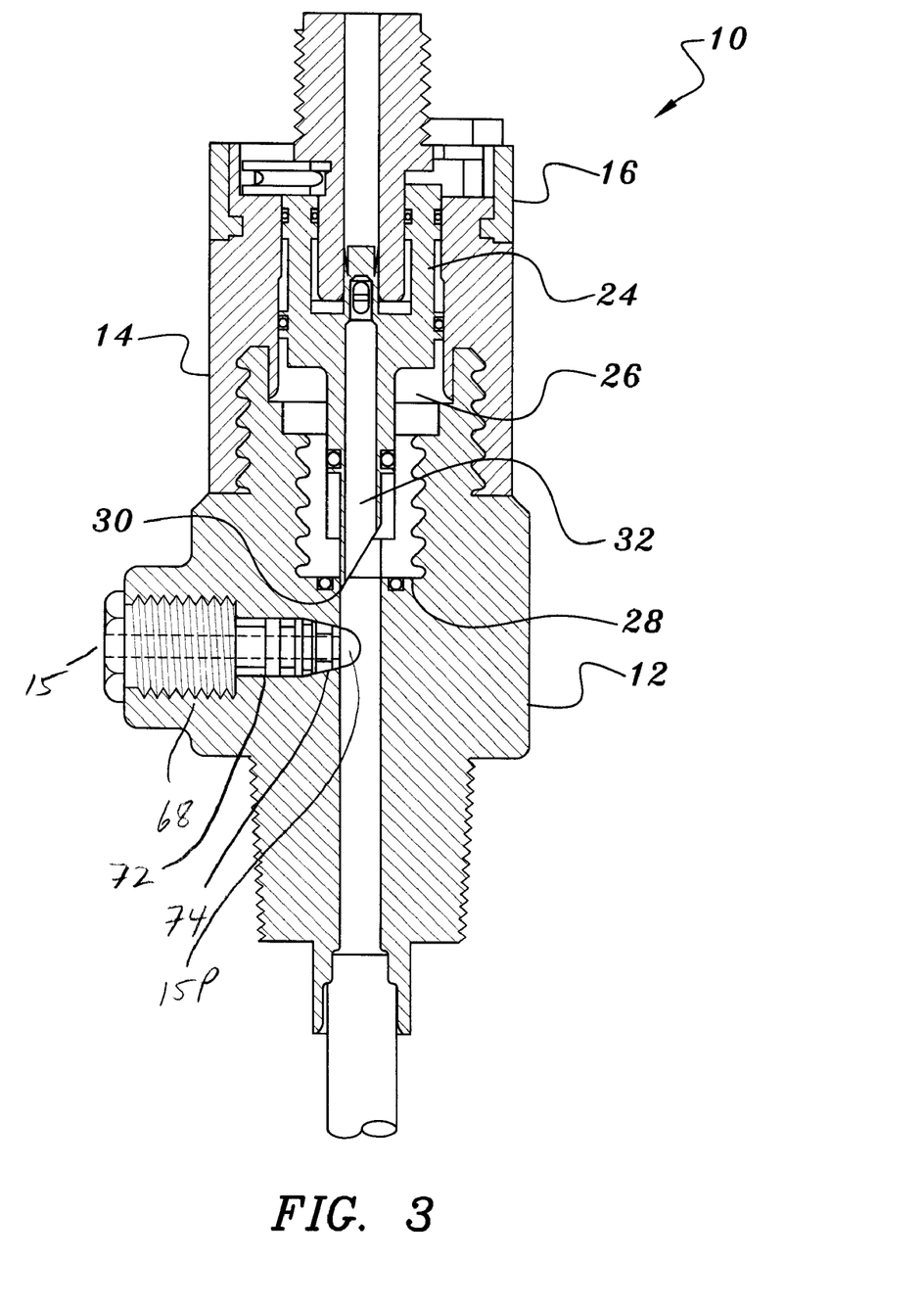
FIG. 3 is another perspective view of the inflator of the invention showing several of the components thereof in shaded phantom.
Figure 4:
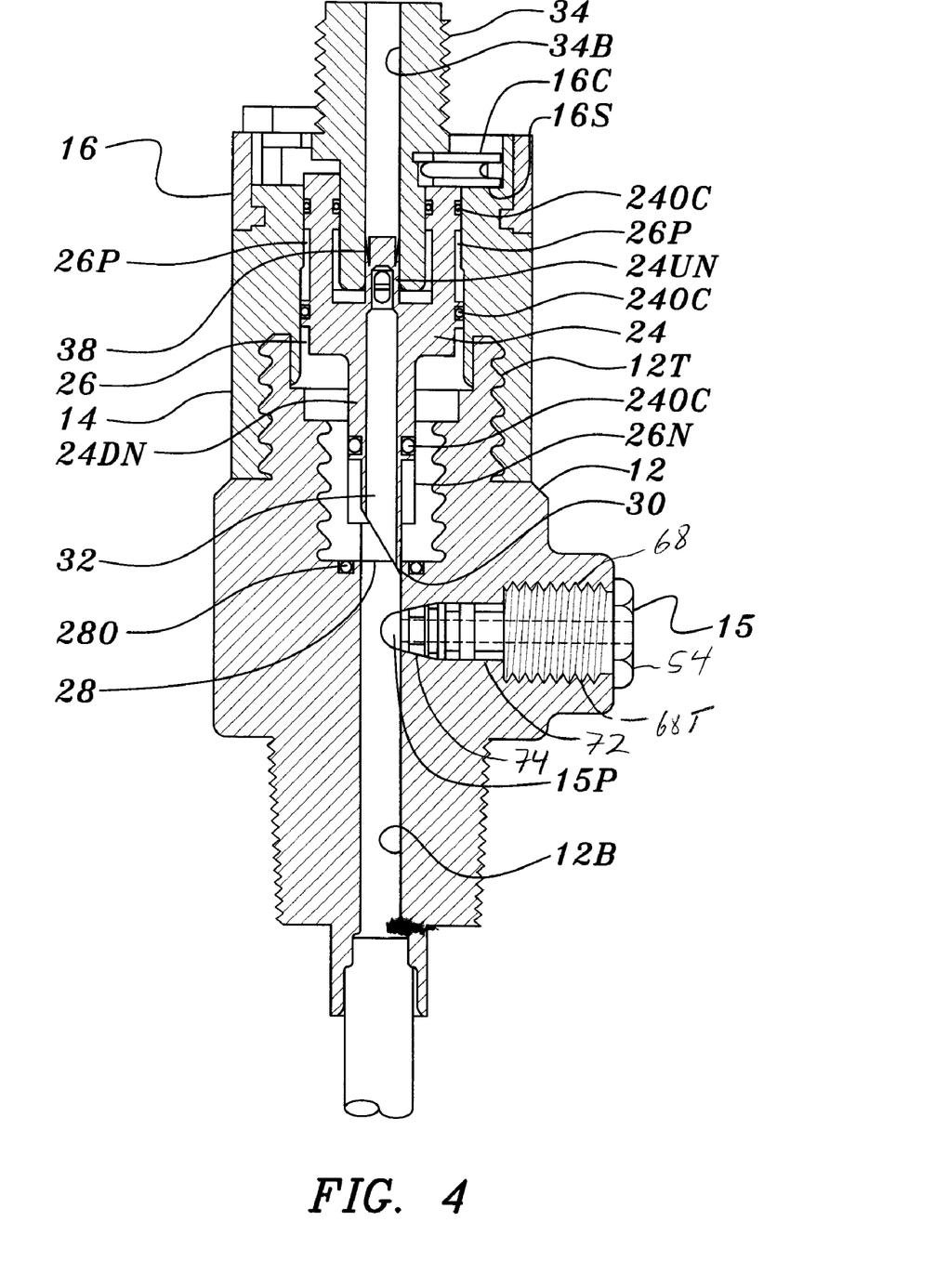
FIG. 4 is a longitudinal cross-sectional view of the inflator of the invention with its inflator position in its "at ready" position.

As shown in FIGS. 3 and 4, the inflator portion 14 further comprises an inflator piston 24 having hollow pierce pin 32 with a pointed tip 30, which are as an assembly reciprocatably mounted within a piston cylinder 26 in alignment with the internal frangible seal 28 of the valve portion 12. The inflator piston 24 is in operative engagement with the cam surface 16S to move inwardly as the cam 16C is rotated.

In operation, upon pulling of the jerk handle 22, cord 20 causes the rotatable cam 16C inside the collar 16 to rotate. Upon rotation of the cam 16C, inflator piston 24 is forced downwardly until the very tip 30 of the hollow pierce pin 32 coupled to the inflator piston 24 makes a small pin-hole in the frangible seal 28 of the valve body 12 (see also FIG. 6). Upon making the pin hole opening in the frangible seal 28, the high-pressure gas contained within the gas cylinder 13 flows therefrom through the inflator piston 24 to pressurize the top portion of the piston cylinder 26 above the inflator piston 24, whereupon the inflator piston 24 is then forced by the high-pressure gas further downwardly to fully drive the pierce pin 32 through and hence fully open the frangible seal 28 (see FIG. 7).

Figure 7:
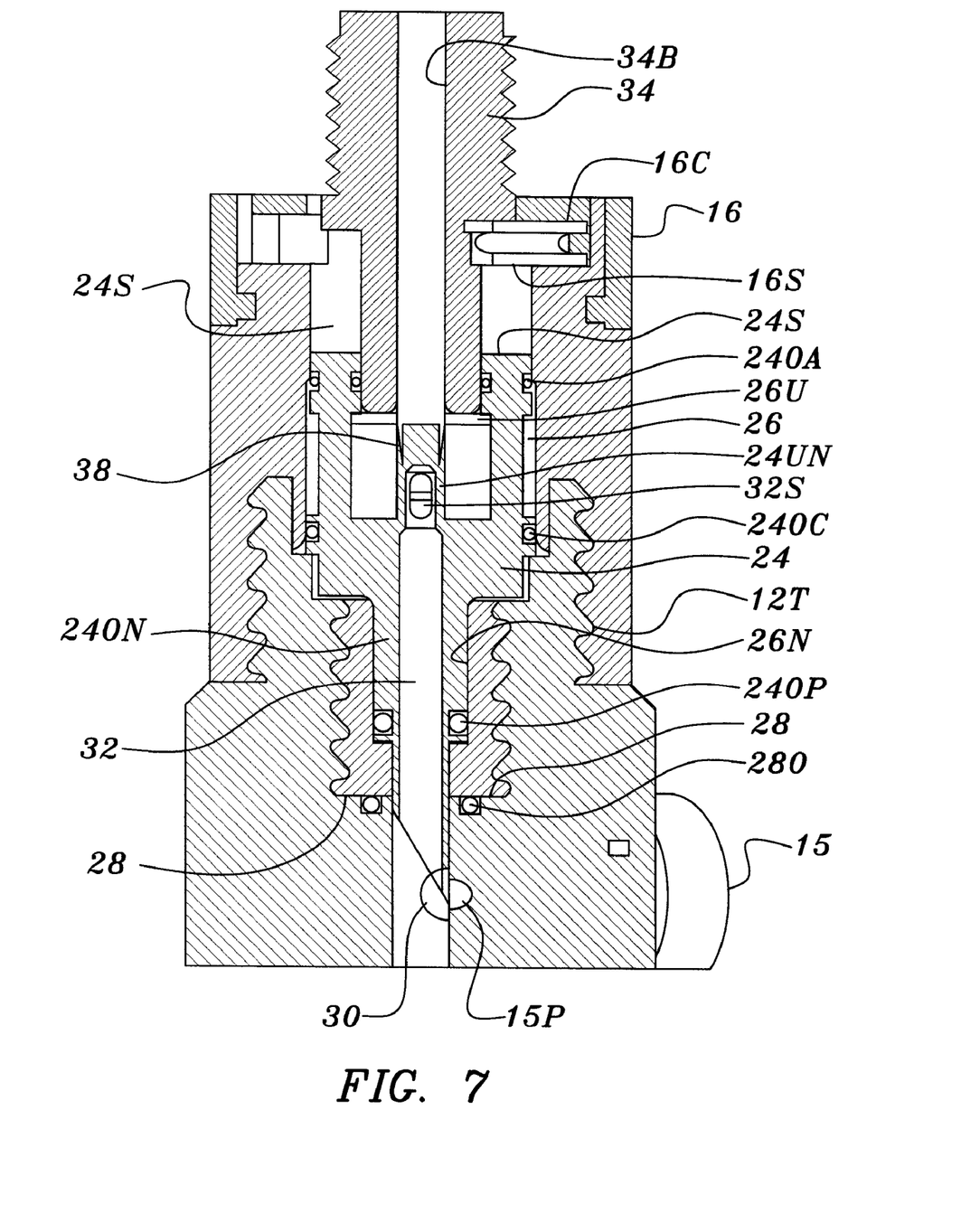
FIG. 7 is a longitudinal cross-sectional view of the inflator of the invention with the inflator piston in its fully fired position with its pierce pin fully fracturing its internal frangible seal.

Upon fully piercing the frangible seal 28, a full flow of escaping gas from the gas cylinder flows through the pierce pin 32 and exits therefrom via side openings 32S to then flow through center bore 34B of the connector boss 34 to which an inflation tube may be threadably coupled.

Figure 5:
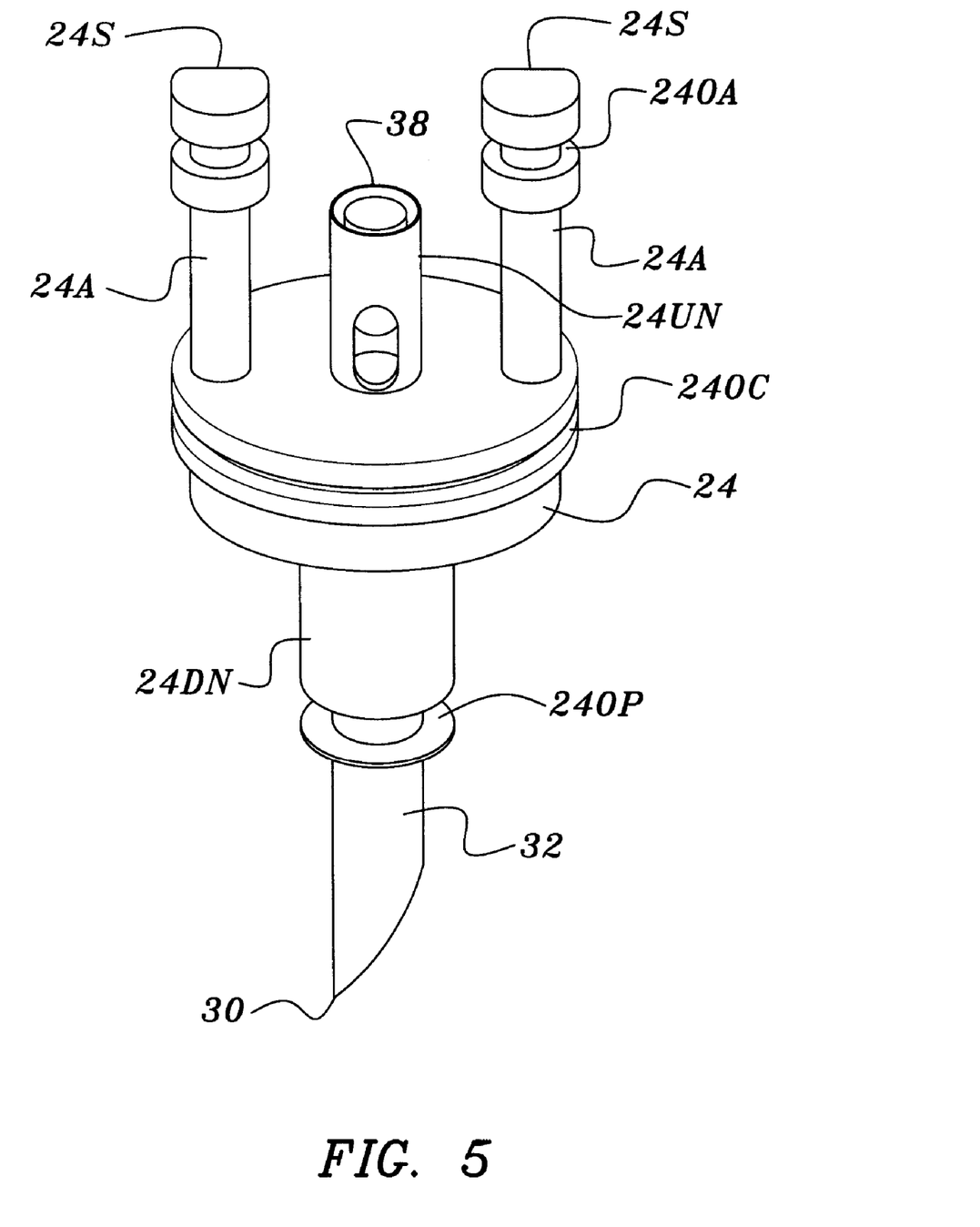
FIG. 5 is a perspective view of the inflator piston.
Figure 6:
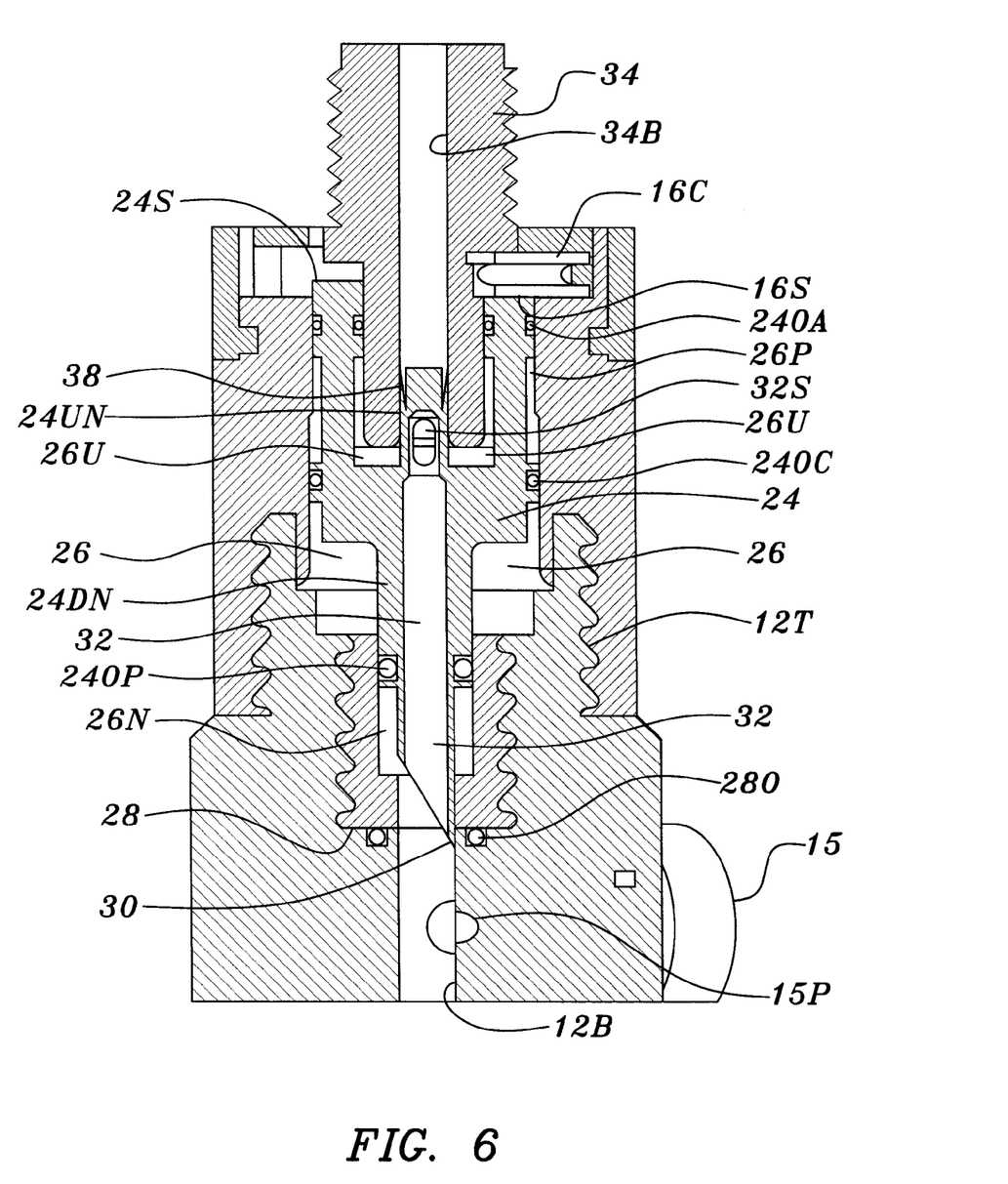
FIG. 6 is a longitudinal cross-sectional view of the inflator of the invention with the inflator piston in its pin-hole piercing position.

Referring to FIG. 5 in conjunction with FIGS. 4, 6 and 7, the inflation piston 24 comprises two upstanding arms 24A with bearing surfaces 24S which cam against the cam surface 16S of the collar 16 as it is rotated upon pulling of the lanyard handle 22. Correspondingly, the piston cylinder 26 comprises two ports 26P configured and dimensioned to slidably receive the upstanding arms 24A and allow reciprocal movement thereof. The inflation piston 24 further includes a depending neck 24DN that is configured and dimensioned to slidably engage into a reduced-diameter portion 26N of the piston cylinder 26. Finally, the inflation piston 24 further includes an upstanding neck 24UN that is configured and dimensioned to slidably engage into the longitudinal bore 34B formed in the connection boss 34.

Both of the upstanding arms 24A may be provided with O-ring slots and O-rings 240A to prevent leakage of gas through the ports 26P into the collar 16. Likewise, inflation piston 24 may be provided with an O-ring slot and O-ring 240C for sealing against the lumen of the piston cylinder 26. The depending neck 24DN of the piston 24 may be provided with an O-ring slot and O-ring 240P to seal the depending neck 24DN within the reduced diameter portion 26N of the cylinder 26. The upstanding neck 24UN of the inflator piston 24 is sealed against the lumen of the longitudinal bore 34B by means of an annular wiper seal 38. Finally, as shown, the frangible seal 28 is sealed within the valve portion 12 by means of a corresponding O-ring slot and O-ring 280.

The operation of the inflator 10 of the invention is best seen upon comparison of FIGS. 4, 6 and 7 wherein FIG. 4 depicts the inflator piston 24 at its "cocked" position; FIG. 6 illustrates the inflator piston 24 moved slightly downwardly to make a pin hole in the frangible seal 28; and FIG. 7 illustrates the inflator piston 24 forced fully downwardly to fully fracture the frangible seal 28 allowing full flow of pressurized gas therethrough.

More particularly, in its "cocked" position as shown in FIG. 4, the inflator piston 24 is positioned within the piston cylinder 26 and sealed with the lumen thereof by means of the O-ring 240C. In this position, the bearing surfaces of two upstanding arms 24A bear against the cam surface 16S of the collar 16 and are sealed within the respective ports 26P by means of the O-ring 240A. The upstanding neck portion 24UN is positioned fully upward within the longitudinal bore 34B and is sealed therewith by means of the annular wiper seal 38. The depending neck 24DN is inserted within the reduced diameter portion 26N and sealed therewith by means of the O-ring 280P.

Referring now to FIG. 6, upon pulling of the jerk handle 22 to "fire" the inflator 10, the rotatable collar 16C is caused to rotate whereupon its cam surface 16S cams against the bearing surfaces 24S of the upstanding arms 24A forcing them downwardly toward the interior of the inflation valve 10. The degree of taper of the cam surface 16S relative to the dimensions of the inflator piston 24 and the frangible seal 28 are such that upon full rotation of the rotatable cam 16C, the tip 30 of the pierce pin 32 makes a small pin hole in the frangible seal 28. The pin hole thus formed allows high pressure gas from the gas cylinder 13 to flow through the longitudinal bore 12B from the pierced frangible seal 28 through the pierce pin 32 and exiting the side openings 32S. Since the longitudinal bore 32B is sealed by means of the wiper seal 38, the gas pressurizes the uppermost portion 26U of the cylinder 26.

As shown in FIG. 7, as the uppermost portion 26U of the cylinder 26 is pressurized, the inflation piston 24 is forcibly urged further inwardly to a position in which the pierce pin 32 completely fractures the frangible seal 28 of the inflator 10. Once the frangible seal 28 is fully pierced and hence fully open, a full flow of compressed gas from the cylinder 13 is allowed to flow through the pierce pin 32 to exit therefrom via openings 32S into the upper portion of cylinder 26. Moreover, since the wiper seal 38 has now moved fully out of the longitudinal bore 34B, the escaping gas flows from the upper portion 26U of the cylinder 26 into the longitudinal bore 34B to inflate the article to be inflated that is fluidly connected to the connector boss 34. It is noted that in this fully opened position, gas is precluded from escaping from the ports 26P by O-rings 240.

Returning now to FIG. 4, it should be appreciated that the valve portion 12 may be threadably coupled to the threaded neck of the gas cylinder 13 without necessarily requiring the installation of the inflator portion 14. Specifically, once the valve portion 12 is threadably coupled to the threaded neck of the gas cylinder 13, the gas cylinder 13 may be filled via inlet 15 and fill port 15P connected in fluid communication with the longitudinal bore 12B of the inflator portion 12. Since the longitudinal bore 12B is sealed by means of the frangible seal 28 of the inflator portion 12, the fill air is forced into the gas cylinder 17 and is not allowed to escape therefrom. Once filled, the fill inlet 16 may be closed by means of a valve (not shown), which may comprise a check valve allowing filling but not discharging of air from the gas cylinder 13. The inflator portion 14 of the inflator 10 of the invention may then be threadably connected to the valve portion 12 by means of thread 12T. Conversely, removal of the inflator portion 14 from the valve portion 12 may be allowed for periodic inspection during maintenance.

Figure 8:
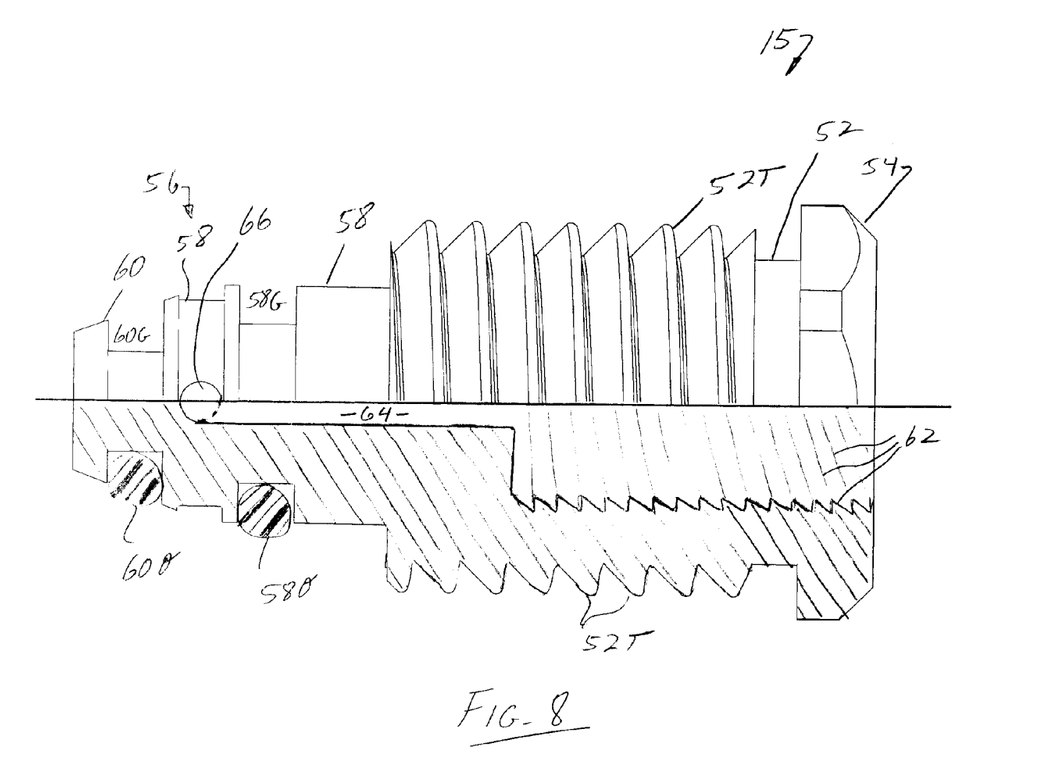
FIG. 8 is a longitudinal cross-sectional view of the inlet valve.

Referring to FIG. 8, a preferred embodiment of the inlet valve 15 comprises a generally circular cylindrical body 52 with external threads 52T. The exposed proximal end 54 of the inlet valve 15 comprises a hex configuration for grasping by a suitable wrench. The internal distal portion end 56 of the inlet valve comprises a shank portion 58 and a reduced-diameter portion 60. The shank portion 58 includes an O-ring groove 58G for receiving an O-ring 580. The reduced-diameter portion 60 likewise includes an O-ring groove 60G for receiving an O-ring 600.

The proximal end 54 of the inlet valve 15 includes a threaded central bore 62 for receiving a fill hose or the like. A central reduced-diameter bore 64 extends from the bottom of the central bore 62 to be in fluid communication with a transverse hole 66 formed through the shank portion 58 of the inlet valve 15 forward of its O-ring groove 58G.

As best seen in FIGS. 3 and 4, an inlet hole 68 is formed in the wall of the valve portion 12. The inlet hole 68 includes a proximal threaded portion 68T for threadably receiving the external threads 52T of the generally circular cylindrical body 52. The distal end 70 of the inlet hole 68 includes a generally circular cylindrical portion 72 and a generally frustro-conical portion 74 that extends into the port 15P of the longitudinal bore 12B.

The generally circular cylindrical portion 72 is dimensioned to sealingly receive the shank portion 58 by virtue of its O-ring 580. The generally frustro-conical portion 74 is shaped to allow the O-ring 600 of the reduced-diameter portion 60 to seal against it when the inlet valve 15 is fully threaded into the inlet hole 68 and to allow venting of pressurized gas from the longitudinal bore 12B when the inlet valve 15 is slightly threaded outwardly to crack the seal between the O-ring 600 and the frustro-conical portion 74 whereupon the pressurized gas is allowed to vent via transverse hole 66 through central bore 62.

After sufficient bleeding of the pressurized gas to reduce its pressure, further outward threading of the inlet valve 15 to a point where the O-ring 600 moves into the generally circular cylindrical portion 72 allows full fluid flow through transverse hole 66 through central bore 62 for subsequent filling via inlet valve 15.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. An inflator, comprising in combination:
   a body portion for connection to a gas cylinder, said body portion including a frangible seal; and
   an inflation piston having a pierce pin for piercing said frangible seal allowing compressed gas from said gas cylinder to flow axially through said inflator, said inflation piston reciprocatably mounted within a piston cylinder, said inflation piston comprising two diametrically-opposed upstanding arms that reciprocate within respective two diametrically-opposed ports in said piston cylinder and an axial upstanding neck positioned between said two diametrically-opposed upstanding arms that reciprocates within an axial longitudinal bore formed in said inflator between said two diametrically-opposed ports, said upstanding neck including a fluid passageway in fluid communication with said pierce pin; and
   a cam surface that engages said upstanding arms to force said inflation piston toward said frangible seal, whereupon upon initial piercing of frangible seal, gas from the gas cylinder flows through said fluid passageway to further urge said inflation piston toward said frangible seal to thereby assist said pierce pin to more fully pierce said frangible seal.

2. An inflation valve, comprising in combination:
   a valve portion to which is coupled an inflator portion;
   said inflator portion comprising
   an inflator collar in which is operatively positioned a rotatable cam, said rotatable cam including a cam surface;
   an inflation piston having a hollow pierce pin with a pointed tip, said piston being reciprocatably mounted axially within a piston cylinder in alignment with a frangible seal, said inflation piston engaging said cam surface to be forced inwardly until said pointed tip makes a small pin-hole in said frangible seal;
   said inflation piston comprising two upstanding arms each with a bearing surface which cams against said cam surface of said rotatable cam as it is rotated and wherein said piston cylinder comprises two ports configured and dimensioned to slidably receive respective said upstanding arm and allow reciprocal movement thereof; and
   said inflation piston further comprising an axial upstanding neck that is configured and dimensioned to slidably engage into an axial longitudinal bore formed in said inflation portion.

3. The inflation valve as set forth in claim 2, wherein said inflation piston further includes a depending neck that is configured and dimensioned to slidably engage into a reduced-diameter portion of said piston cylinder.

4. The inflation valve as set forth in claim 3, wherein said upstanding neck of said inflation piston comprises an annular wiper seal to seal against a lumen of said longitudinal bore.

5. The inflation valve as set forth in claim 2, further including an inlet valve.

6. The inflation valve as set forth in claim 5, wherein said inlet valve comprises an inlet hole having a generally frustro-conical surface portion that seals against a reduced-diameter portion of a valve body when threaded into the inlet hole.

7. An inflation method comprising the steps of:
positioning an inflation piston having a pierce pin, said inflation piston being reciprocatably mounted within a piston cylinder, said inflation piston comprising two upstanding arms that reciprocate within respective two ports in said piston cylinder and an axial upstanding neck that reciprocates within an axial longitudinal bore formed in an inflation body, said upstanding neck including a fluid passageway in fluid communication with said pierce pin; and
moving a cam surface in contact with said upstanding arms to force said pierce pin of said inflation piston to make at least a small pin hole in a frangible seal allowing high pressure gas from a gas cylinder to flow through said fluid passageway into said piston cylinder; and said high pressure gas in said piston cylinder further moving said inflation piston to more fully force said pierce pin into said frangible seal.

8. The method as set forth in claim 7, wherein said cam surface comprises a rotating cam surface that is rotated by a pull on a lanyard cord connected thereto.

9. The method as set forth in claim 7, further comprising the step of filling said gas cartridge via an inlet valve.

10. The inflation valve as set forth in claim 9, wherein said inlet valve comprises an inlet hole having a generally frustro-conical surface portion that seals against a reduced-diameter portion of a valve body when threaded into the inlet hole.

* * * * *